(12) United States Patent
Dull

(10) Patent No.: US 10,921,210 B2
(45) Date of Patent: Feb. 16, 2021

(54) SEALING AND TESTING SEGMENTED TOOLS

(71) Applicant: The Boeing Company, Chicago, IL (US)

(72) Inventor: Kenneth M. Dull, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 311 days.

(21) Appl. No.: 15/368,367

(22) Filed: Dec. 2, 2016

(65) Prior Publication Data

US 2017/0074749 A1 Mar. 16, 2017

Related U.S. Application Data

(62) Division of application No. 13/925,970, filed on Jun. 25, 2013, now Pat. No. 9,523,431.

(60) Provisional application No. 61/829,639, filed on May 31, 2013.

(51) Int. Cl.
| | |
|---|---|
| *G01M 3/32* | (2006.01) |
| *B29C 70/44* | (2006.01) |
| *F16J 15/02* | (2006.01) |
| *G01M 3/04* | (2006.01) |
| *B29C 33/00* | (2006.01) |
| *B29C 33/48* | (2006.01) |

(52) U.S. Cl.
CPC ....... *G01M 3/3236* (2013.01); *B29C 33/0038* (2013.01); *B29C 33/485* (2013.01); *B29C 70/44* (2013.01); *F16J 15/02* (2013.01); *G01M 3/04* (2013.01)

(58) Field of Classification Search
CPC ... G01M 3/3236; F16J 15/02; B29C 33/0038; B29C 33/485
USPC .......................................................... 73/37
See application file for complete search history.

(56) References Cited

U.S. PATENT DOCUMENTS

| | | | |
|---|---|---|---|
| 8,303,758 B2 * | 11/2012 | Chapman | B29C 70/323 |
| | | | 156/173 |
| 8,382,037 B2 | 2/2013 | Biornstad et al. | |
| 9,523,431 B2 | 12/2016 | Dull | |
| 2009/0033013 A1 | 2/2009 | Cleary et al. | |
| 2013/0020009 A1 | 1/2013 | Pham et al. | |
| 2013/0068450 A1 | 3/2013 | Phadke et al. | |
| 2014/0353916 A1 | 12/2014 | Dull | |

FOREIGN PATENT DOCUMENTS

| | | |
|---|---|---|
| CN | 101151142 A | 3/2008 |
| CN | 101600552 A | 12/2009 |
| CN | 101815601 A | 8/2010 |

(Continued)

OTHER PUBLICATIONS

Japanese Notice of Reasons for Rejection and English Translation, dated Apr. 10, 2018, regarding Application No. 2014-110807, 5 pages.

(Continued)

*Primary Examiner* — John Fitzgerald
*Assistant Examiner* — Rodney T Frank
(74) *Attorney, Agent, or Firm* — Yee & Associates, P.C.

(57) ABSTRACT

A substantially air-tight triple seal arrangement along a seam between first and second tool segments comprises inner, middle and outer seals forming first and second substantially air tight vacuum chambers.

20 Claims, 8 Drawing Sheets

(56) References Cited

FOREIGN PATENT DOCUMENTS

| | | |
|---|---|---|
| CN | 102135182 A | 7/2011 |
| CN | 102325647 A | 1/2012 |
| CN | 102686381 A | 9/2012 |
| JP | H01208120 A | 8/1989 |
| JP | H02299820 A | 12/1990 |
| JP | H0647824 A | 2/1994 |
| JP | 2006167981 A | 6/2006 |
| JP | 2010507504 A | 3/2010 |
| WO | WO2008049975 A1 | 5/2008 |
| WO | WO2009018097 A1 | 2/2009 |
| WO | WO2014067864 A1 | 5/2014 |

OTHER PUBLICATIONS

Extended European Search Report, dated Oct. 28, 2014, regarding Application No. EP14169945.4, 6 pages.
Canadian Intellectual Property Office Examination Search Report, dated Jul. 2, 2015, regarding Application No. 2,851,006, 4 pages.
State Intellectual Property Office of PRC Notification of First Office Action, dated Jun. 2, 2017, regarding Application No. 201410240280.3, 14 pages.

\* cited by examiner

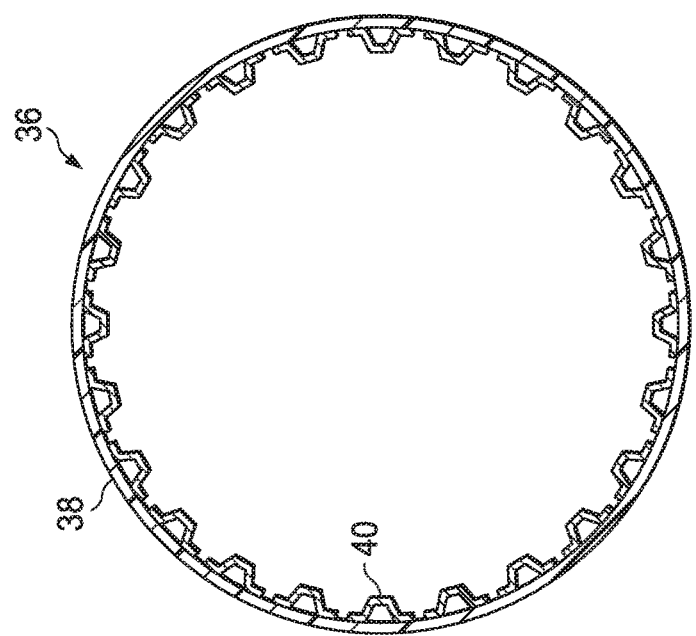
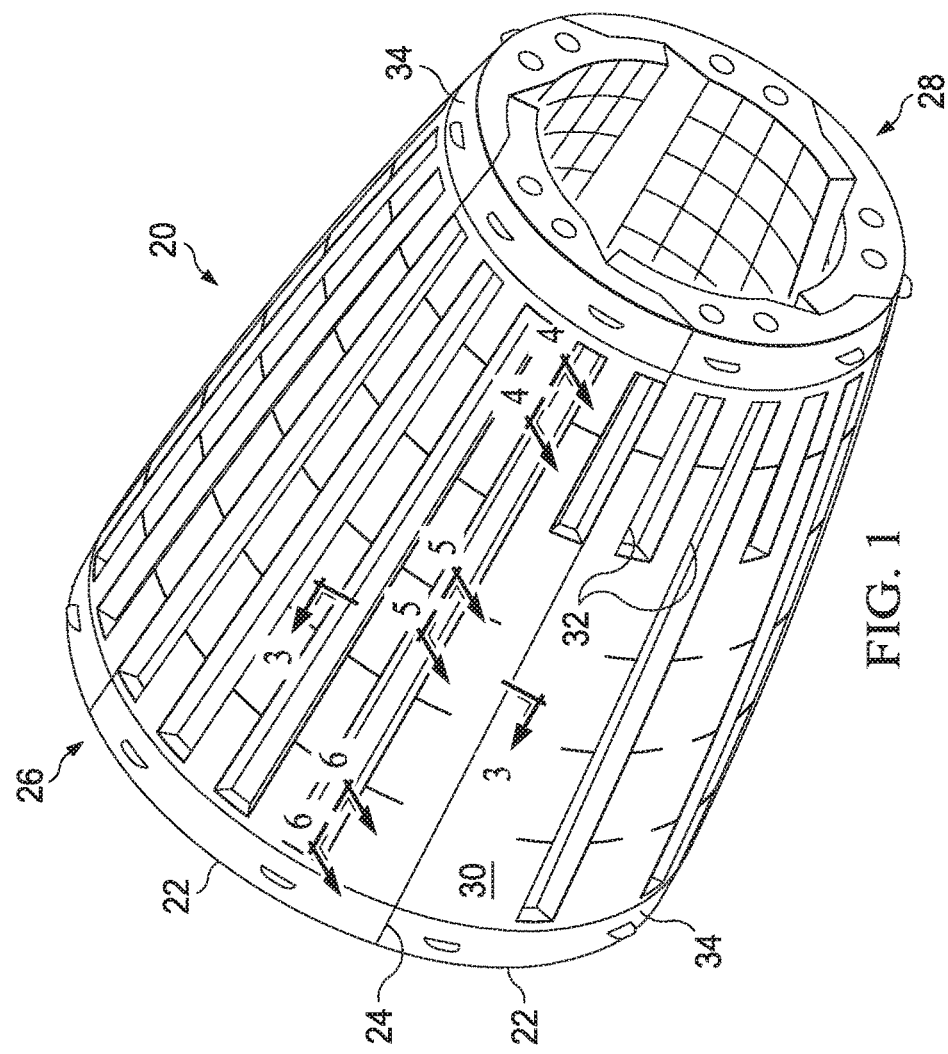

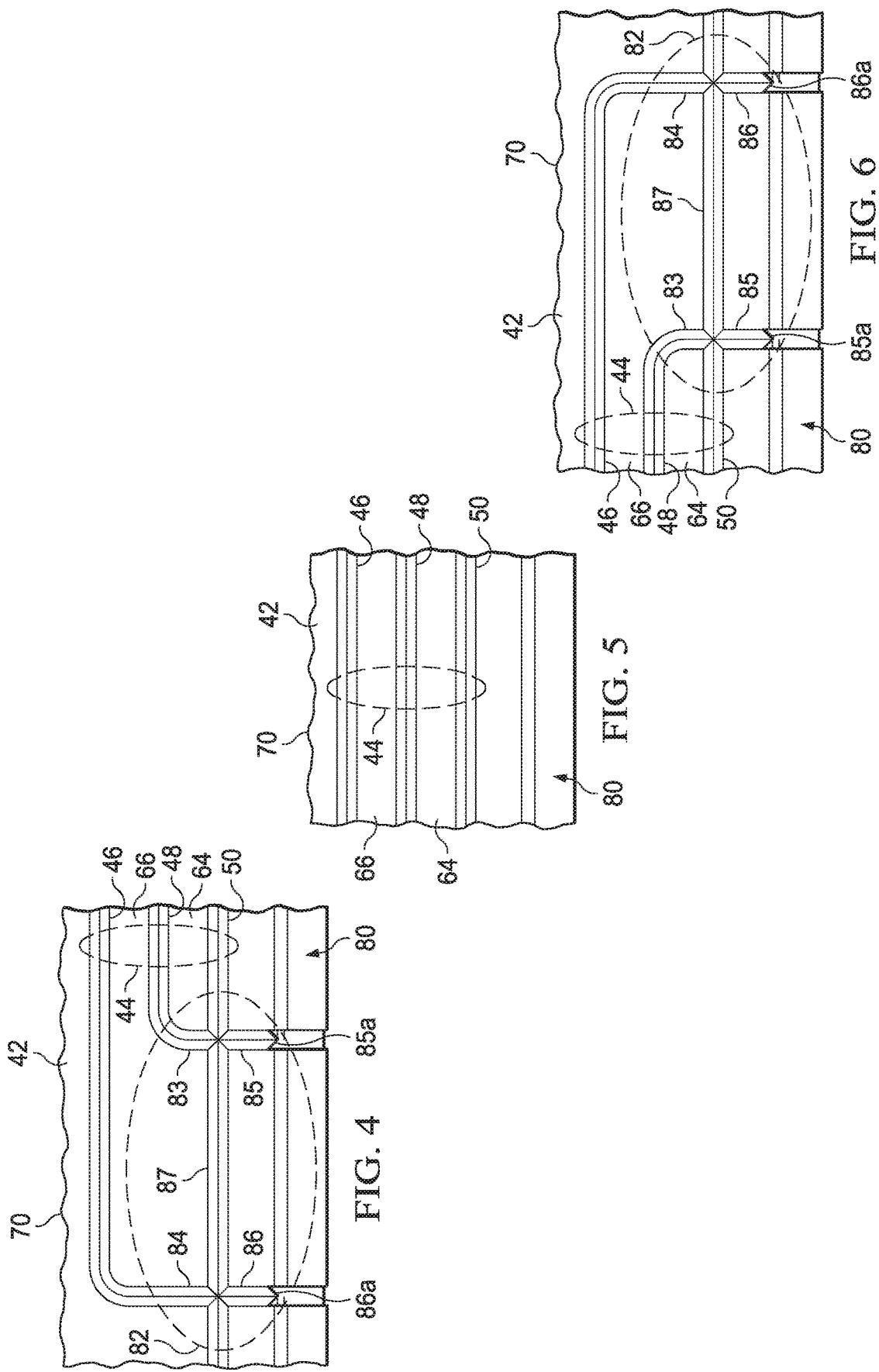

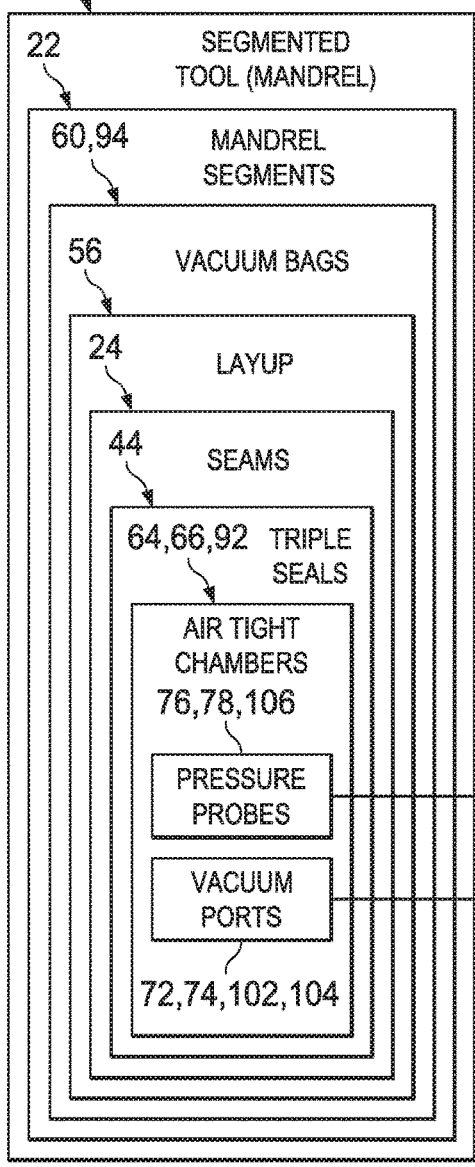

112 — FORMING AN INNER BAG VACUUM CHAMBER

114 — FORMING AN OUTER VACUUM BAG CHAMBER AND H-SHAPED SEAL AREA

116 — FORMING AN OUTER SEAL CHAMBER

118 — FORMING AN INNER SEAL CHAMBER

120 — DETECTING A LEAK (SENSE PRESSURE CHANGE IN CHAMBERS)

FIG. 13

122 — ARRANGE AN INNER SEAL, AN OUTER SEAL AND A MIDDLE SEAL TO FORM FIRST AND SECOND SEAL CHAMBERS

124 — APPLY A VACUUM TO EACH OF THE FIRST AND SECOND SEAL CHAMBERS

126 — DETECT A LEAK IN ANY OF THE INNER SEAL, THE OUTER SEAL AND THE MIDDLE SEAL BY SENSING A CHANGE IN VACUUM PRESSURE WITHIN THE FIRST AND SECOND SEAL CHAMBERS

SEALING AND TESTING SEGMENTED TOOLS

CROSS REFERENCE TO RELATED APPLICATIONS

This application claims the benefit of priority to U.S. patent application Ser. No. 13/925,970, filed Jun. 25, 2013, now U.S. Pat. No. 9,523,431, which claims the benefit of priority to Provisional U.S. Patent Application No. 61/829,639 filed May 31, 2013, the entire contents of both aforementioned applications are incorporated by reference herein.

BACKGROUND INFORMATION

1. Field

The present disclosure generally relates to segmented tools having multiple pieces that are sealed together, and deals more particularly with a triple seal arrangement and related method allowing the integrity of the individual seals to be tested and monitored.

2. Background

Some tools comprise multiple pieces or segments that must be assembled, but which are required to function and perform function as a seamless, single tool. For example, in the aircraft industry, a large composite fuselage section may be laid up on, vacuum bagged and then autoclave cured on a generally cylindrical mandrel comprising multiple circumferential mandrel segments. The mandrel segments are assembled along seams. Following curing and de-bagging, the mandrel segments must be disassembled in order to allow release and removal of the cured fuselage section from the tool.

Each seam between the mandrel segments may be sealed with a substantially air-tight seal extending along joining surfaces of adjacent mandrel segments. Air leakage through any of one of these seals may reduce compaction pressure applied to the fuselage section during curing. A reduction in compaction pressure during curing due to an air leak may have an undesirable effect on the quality and/or performance of the cured fuselage section.

One proposed solution to the problem of seal leakage involves the provision of double seals along the seams between the mandrel segment seams. The double seals are arranged to form a chamber that may be used to perform a pass or fail leak test, however, the test does not indicate which of the double seals may have lost its integrity. If the test fails, indicating that the integrity of at least one of the seals may have been compromised, the tool segments must be disassembled, and the seals must be repaired or replaced, following which the mandrel segments must be reassembled and the leak test must be repeated. The process of disassembling/reassembling and replacing the seals is time consuming, labor intensive and may reduce production throughput and build rate.

Accordingly, there is a need for a method of sealing and testing the integrity of seals in segmented tools such as mandrels that allows continuous monitoring of seal integrity. There is also a need for a seal arrangement and testing method which will identify which, if any, of the seals are leaking and whether at least one seal has retained its integrity.

SUMMARY

The disclosed embodiments provide a method and system for sealing and testing multi-piece tools such as segmented mandrels, in an autoclave environment. A triple seal along seams between the mandrel segments provide added protection against loss vacuum pressure due to seal leaks. The triple seal may be tested for leaks during assembly of the mandrels, before a layup is placed on the tool and loaded into an autoclave. The need for replacing and/repairing seals is reduced, the quality of cured parts may be improved, and production throughput may be increased.

According to one disclosed embodiment, a method is provided for sealing and monitoring multiple segments of a mandrel in an autoclave environment. The method includes forming an inner bag vacuum chamber overlapping ends and seams of the mandrel segments and an inner seal between the mandrel segments, and forming an outer vacuum bag chamber and an H-shaped seal area on opposite ends of the inner bag vacuum chamber. The method also includes forming an outer seal chamber using the H-shaped seal area, the inner seal and a middle seal, forming an inner seal chamber using the middle seal and the inner seal, and monitoring the integrity of any of the inner seal, the middle seal and the outer seal. The method may further comprise pressing the inner seal, the middle seal, the outer seal and legs of the H-shaped seal area into grooves within the mandrel segments. Forming the outer vacuum bag chamber includes sealing the legs of the H-shaped seal area to the inner and outer vacuum bags. Forming the outer bag vacuum chamber includes sealing legs of the H-shaped seal area to the inner seal and the middle seal. Monitoring the integrity includes sensing a change in vacuum pressure within any of the inner bag vacuum chamber, the inner seal chamber and the outer seal chamber.

According to another embodiment, a method is provided of sealing and testing the integrity of seals between at least two segments of a tool, comprising arranging an inner seal, an outer seal and a middle seal to form first and second seal chambers between the two tool segments, and applying a vacuum to each of the first and second seal chambers. A leak in the inner seal or the outer seal is detected by sensing a change in vacuum pressure within the first and second seal chambers. The method may further comprise placing an H-shaped seal area between the two tool segments, and connecting legs of the H-shaped seal area to each of the middle and the outer seals. The method may also comprise placing an inner vacuum bag over the two tool segments, and sealing the inner vacuum bag to the H-shaped seal area. The method may further comprise placing an outer vacuum bag over the two tool segments covering the inner vacuum bag, and sealing the outer vacuum bag to legs of the H-shaped seal area. The method may also comprise using the outer vacuum bag to apply pressure to a seal between the inner vacuum bag and the H-shaped seal area.

According to still another embodiment, a method is provided of autoclave processing a composite part on a segmented tool, comprising forming a triple seal between adjoining segments of the tool, including forming an inner seal, a middle seal and an outer seal, placing an inner vacuum bag over the segmented tool covering the composite part, and forming an inner bag vacuum chamber by forming a seal between the inner vacuum bag and the inner seal. The method may also comprise placing an outer vacuum bag over the segmented tool covering the inner vacuum bag, forming an outer bag vacuum chamber by forming a seal between the outer vacuum bag and the outer seal, drawing vacuums respectively within the inner vacuum bag chamber and the outer vacuum bag chamber, and using the outer vacuum bag to apply pressure to the seal between the inner vacuum bag and the inner seal. The method further includes compressing the triple seal by applying autoclave pressure to the segments of the tool. The method may also comprise detecting a leak in any one of the inner seal, the middle seal or the outer seal. The inner seal, the middle seal and the outer seal are arranged to form an inner seal chamber and an outer seal chamber, and detecting the leak is performed by sensing a change in vacuum pressure in either the inner seal chamber or the outer seal chamber. Forming the outer vacuum bag chamber further includes forming an H-shaped seal between the adjoining segments of the tool outside of the inner vacuum bag chamber.

According to still another embodiment, a substantially air-tight seal arrangement along a seam between first and second tool segments is provided, comprising inner, middle and outer seals forming first and second substantially air tight vacuum chambers. The inner, middle and outer seals extend along a length of the seam, and are arranged in an H-shaped pattern at each of opposite ends of the seam. The first and second tool segments are arranged to form a layup surface, and the H-shaped pattern includes first and second legs adapted to be sealed to first and second vacuum bags covering the layup surface. The inner, the middle and the outer seals are spaced apart from, and extend longitudinally along the seam. In one variation, the inner and middle seals are spaced apart from each other and form the first vacuum chamber, and the middle and outer seals are spaced apart from each other and form the second vacuum chamber. The seal arrangement may further comprise an H-shaped seal area located at opposite ends of the seam and connected to the middle seal and the outer seal. Each of the first and second vacuum chambers is adapted to be coupled with a vacuum source and a vent for independently testing the inner, middle and outer seals for air leaks. The seal arrangement may also comprise first and second vacuum probes for respectively sensing vacuum pressure in the first and second vacuum chambers.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 1 is an illustration of a perspective view of a segmented mandrel having seams with triple seals according to the disclosed method.

FIG. 2 is an illustration of a cross-sectional view of a composite shell laid up and cured on the segmented mandrel shown in FIG. 1.

FIG. 4 is an illustration of a perspective view of the forward end of the triple seal between mandrel segments at the location along the seam designated as "4" in FIG. 1.

FIG. 5 is an illustration of a perspective view of a middle section of the triple seal between the mandrel segments at the location along the seam designated as "5" in FIG. 1.

FIG. 6 is an illustration of a perspective view of an aft end of the triple seal between the mandrel segments at the location along the seam designated as "6" in FIG. 1.

FIG. 11 is an illustration of a functional block diagram showing the components of the segmented mandrel and a related control system for testing and monitoring the triple seal.

FIG. 12 is an illustration of a flow diagram of a method of sealing a segmented tool.

FIG. 13 is an illustration of a flow diagram of an alternate embodiment of a method of sealing a segmented tool.

DETAILED DESCRIPTION

Figure 3:
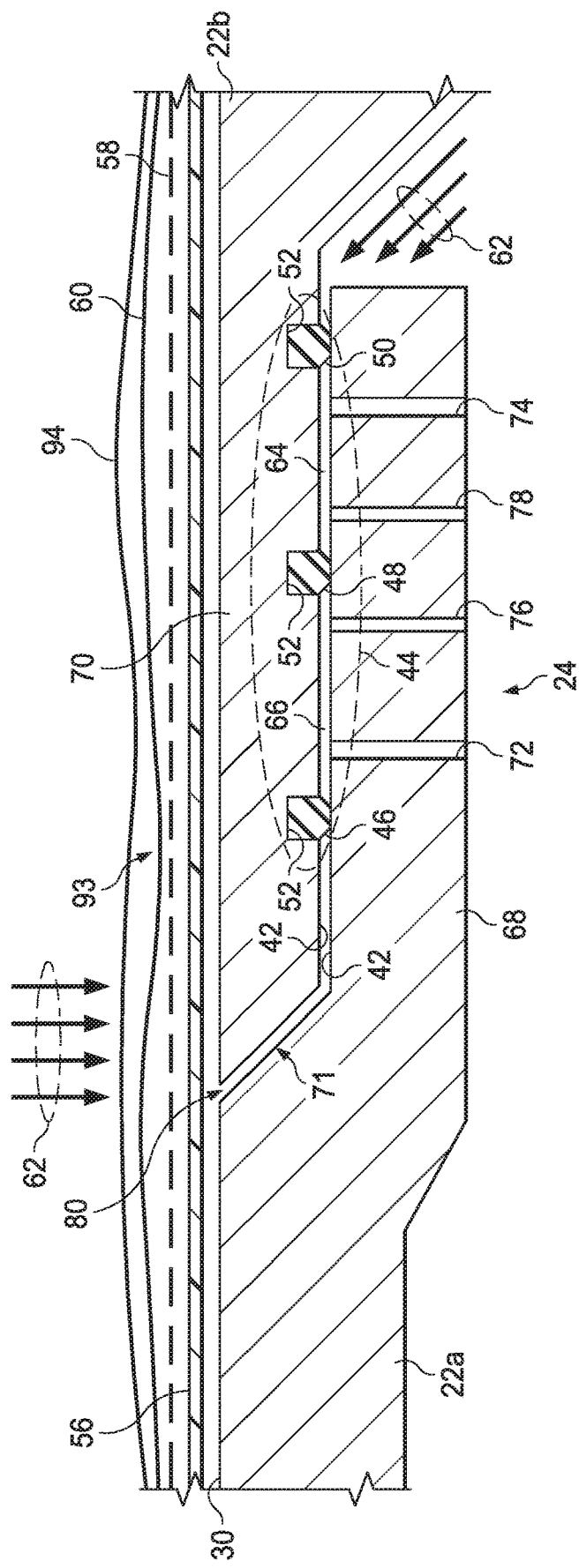
FIG. 3 is an illustration of a sectional view taken along the line 3-3 in FIG. 1.

Referring to FIGS. 1 and 2, a segmented layup tool 20 (FIG. 1), sometimes also hereinafter referred to as a segmented mandrel 20, may be used as a mandrel on which a composite part may be laid up and cured. For example, and without limitation, the segmented mandrel 20 may be used to layup and cure the composite shell 36 shown in FIG. 2. The composite shell 36 includes an outer composite skin 38 stiffened by longitudinally extending, composite stringers 40. Although not shown in FIG. 2, the composite shell 36 may be attached to a circumferentially extending, internal frame to form a barrel section of an airplane fuselage (not shown).

The layup tool 20 includes a forward end 26 and an aft end 28, and comprises a plurality of mandrel segments 22 that are joined together along longitudinal seams 24. As will be discussed below in more detail, the seams 24 include a triple, substantially air-tight seal (not shown in FIG. 1) that seals the mandrel segments 22 together so that they act as a single tool. In the illustrated embodiment, the layup tool 20 has a generally tapered cylindrical or barrel shape, however other shapes are possible, depending upon the shape of the part to be fabricated.

The mandrel segments 22 collectively form a layup surface 30 upon which composite material such as pre-preg, may be laid up to form the composite shell 36 shown in FIG. 2. The layup surface 30 forms the IML (inner mold line) of the composite skin 38, and may include a plurality of circumferentially spaced, longitudinally extending stringers grooves 32 into which preformed composite stringer layups (not shown in FIG. 1) may be placed before the skin 38 is laid up over the layup surface 30. The layup tool 20 further includes a substantially smooth, circumferentially extending bands 34 on the forward and aft ends 26, 28 which are located longitudinally beyond the layup surface 30. The bands 34 provide a surface to which one or more later discussed vacuum bags (not shown in FIG. 1 or 2) may be attached and sealed in order to compact and consolidate the composite shell 36 during curing, which may be carried out within an autoclave (not shown).

FIGS. 3-6 illustrate one embodiment of a lap joint or seam 24 between two adjacent ones of the mandrel segments 22a, 22b. FIG. 3 depicts a composite skin 56 having been laid up on layup surface 30, covered by a caul plate 58, an inner vacuum bag 60 and an outer vacuum bag 94. For simplicity of description, additional elements such as release films, breathers, etc. are not shown. As will be discussed later in more detail, the inner vacuum bag 60 is sealed to the bands 34 (FIG. 1), outside of the layup surface 30. In one embodiment, the seams 24 between the mandrel segments 22a, 22b are formed by overlapping, peripheral inner and outer flanges 68, 70 forming mating, sealing surfaces 42. The sealing surfaces 42 are sealed together by a substantially air-tight triple seal 44 comprising an outer first seal 46, a middle second seal 48, and an inner third seal 50. The opposite ends of the seals 46, 48, 50 are arranged and connected to form H-shaped seal areas 82 which are respectively located beyond the ends of the skin layup 56, beneath the bands 34.

Referring to FIGS. 4 and 6, each of the H-shaped seal areas 82 comprises a pair of inner legs 83, 84, a pair of outer legs 85, 86 and a cross leg 87. In the illustrated embodiment, the legs 83, 84, 85, 86 and 87 are arranged in the shape of an "H", however, depending upon the application, these legs may be arranged to form other shapes. The outer ends or tips 85a, 86a of the outer legs 85, 86 are respectively sealed to the inner and outer vacuum bags 60, 94 (see FIG. 9). The seals 46, 48, 50 may be formed, for example and without limitation, by casting and/or extruding a suitable material such as silicone. The outer, middle and the inner seals 46, 48, 50 respectively, are circumferentially spaced apart from each other, and in the illustrated embodiment, are held within respectively associated grooves 52 (FIG. 3) formed in the sealing face 42 of the outer flange 70. The tips 85a, 86a may be formed of a material such as, without limitation, Viton® or a similar fluoroelastomer which is suited to provide good adherence to vacuum bag sealant (not shown) used to seal the tips 85a, 86a to the inner and outer vacuum bags 60, 94. In other embodiments, the outer, middle and the inner seals 46, 48, 50 respectively, as well as the H-shaped seal areas 82 may be held in grooves (not shown) formed in the inner flange 68, and seal against the outer flange 70. In still other embodiments some of the seals 46, 48, 50 and the seal area 82 may be formed in each of the inner and outer flanges 68, 70 respectively.

The area between the middle seal 48 and the inner seal 50 forms an inner, first seal chamber 64, and the area between the middle seal 48 and the outer seal 46 forms an outer, second seal chamber 66. The inner flange 68 is provided with at least one vacuum port 72 and a pressure probe 76 which communicate with the outer seal chamber 66. The inner flange 68 is also provided with at least one vacuum port 74 and a pressure probe 78 which communicate with the inner seal chamber 64. The vacuum port 72 is used to selectively draw a vacuum or vent the outer seal chamber 66, and a change in the pressure within the outer seal chamber 66 may be sensed by pressure probe 76. Similarly, the vacuum port 74 is used to selectively draw a vacuum or vent the inner seal chamber 64, and a change in the pressure within the inner seal chamber 64 may be sensed by the vacuum pressure probe 78. Although not shown in FIG. 3, one or more vacuum ports and pressure probes are coupled with the area beneath each of the inner and outer vacuum bags 60, 94 in order to evacuate the vacuum bag 60, 94 and separately sense vacuum pressures within the inner and outer vacuum bags 60, 94. The inner bag 60 forms an inner bag vacuum chamber 92 (FIG. 9) within which a part vacuum is drawn. The compaction pressure applied by the inner bag 60 to the composite skin layup 56 is supplemented by pressure applied by the outer bag 94, and external autoclave pressure 62.

Figure 7:
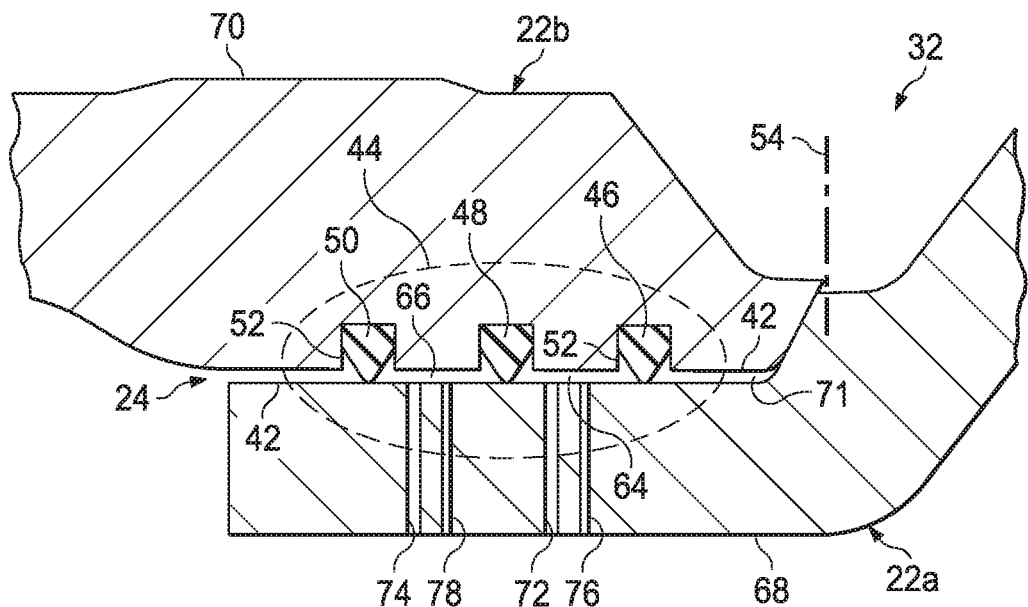
FIG. 7 is an illustration of a cross-sectional view of another embodiment of a seam between two of the mandrel segments.

FIG. 7 illustrates an alternate embodiment of one of the seams 24 employing a triple seal 44, similar to the embodiment shown in FIG. 3. In this example, the seams 24 between adjacent mandrel segments 22a, 22b are formed adjacent to the centerline 54 of the stringer grooves 32 into which stringer layups (not shown) are placed before the composite skin 38 is laid up over the layup tool 20. In this example, part of each stringer groove 32 is formed along each of the mandrel segments 22a, 22b at the seam 24.

Figure 8:
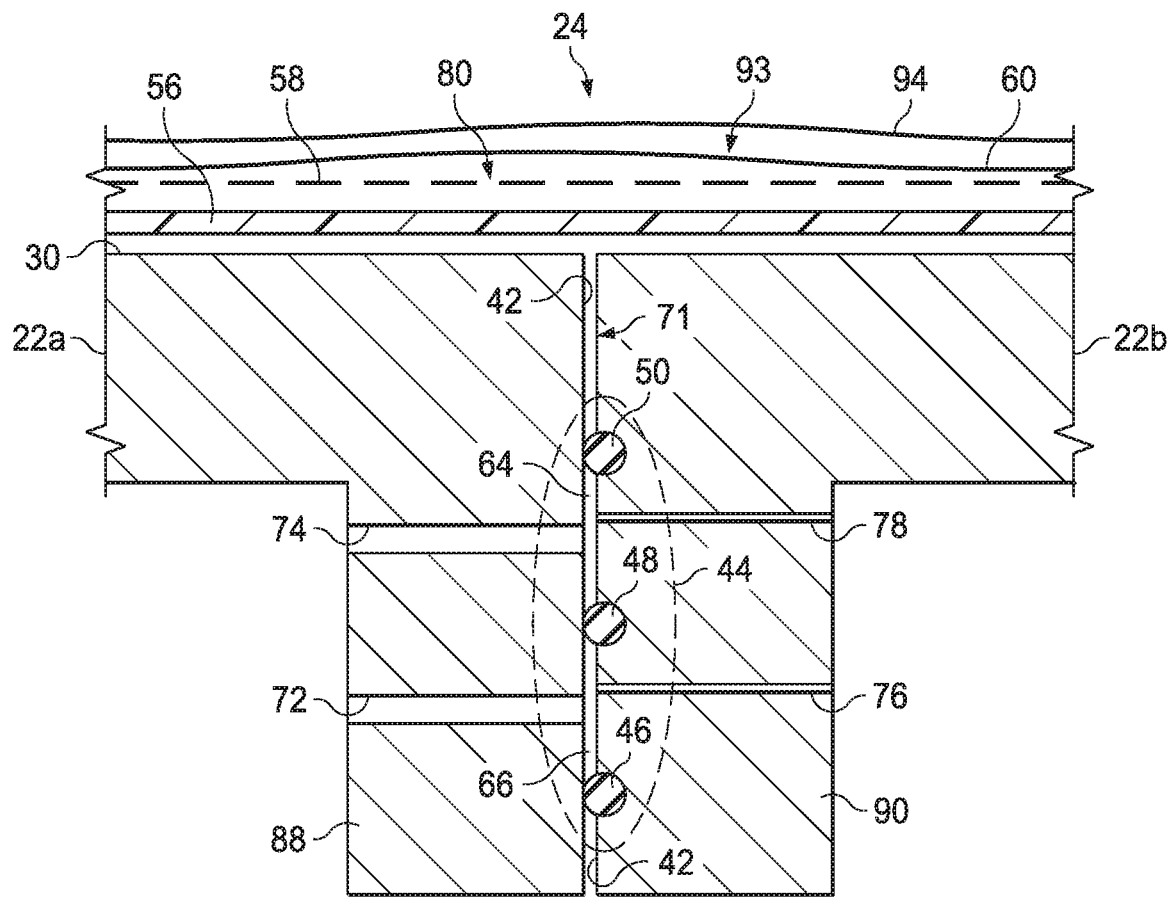
FIG. 8 is an illustration of a cross-sectional view of a further embodiment of a seam between two of the mandrel segments.

FIG. 8 illustrates a further embodiment of a seam 24 between adjacent mandrel segments 22a, 22b. In this example, the mandrel segments 22a, 22b respectively have opposing flanges 88, 90 which extend radially inwardly from the layup surface 30, effectively forming a sealed joint between the mandrel segments 22a, 22b along the seam 24.

Figure 9:
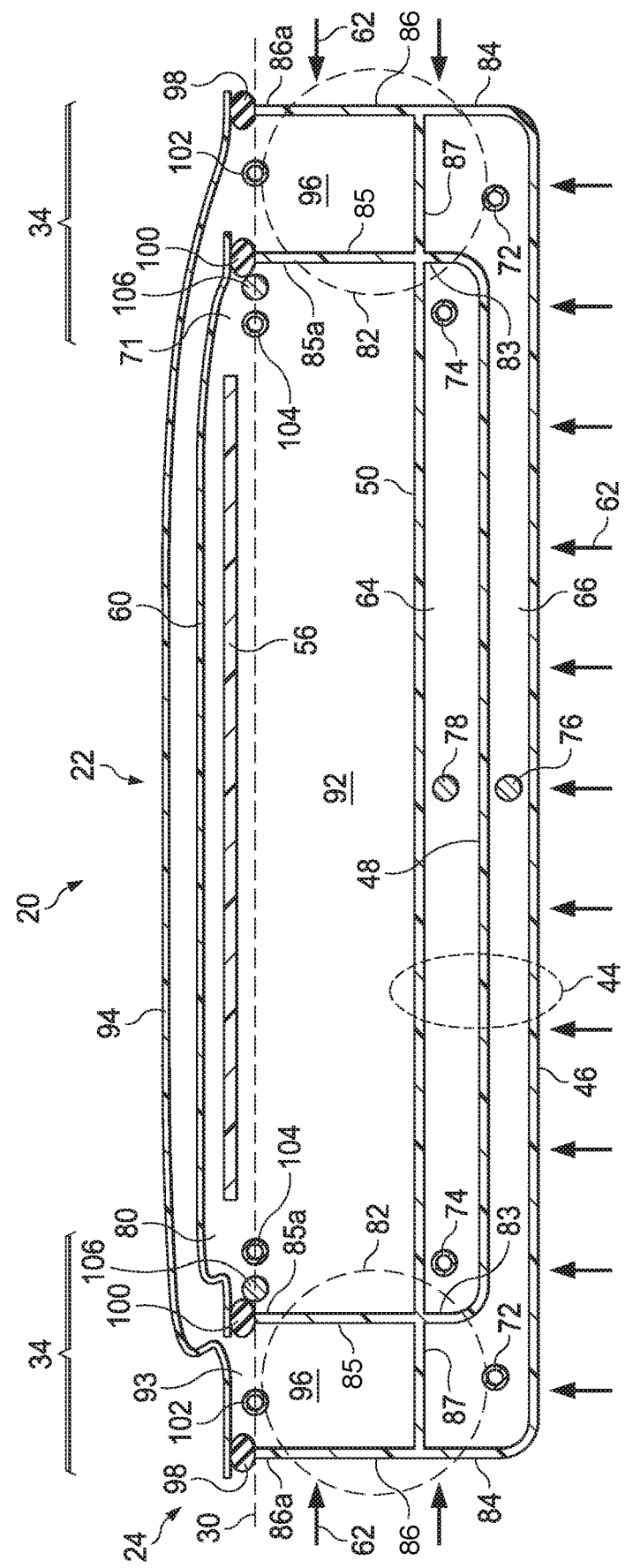
FIG. 9 is an illustration of a diagrammatic cross-sectional view along one of the seams, showing how the triple seal is connected to the inner and outer vacuum bags.

Attention is now directed to FIG. 9 which diagrammatically illustrates components of the layup tool 20 along one of the seams 24; a caul plate, breathers, and release films having been omitted for simplicity. The composite skin 56 is laid up on the layup surface 30 which forms the IML of the finished part. The inner vacuum bag 60 is sealed by an inner bag seal 100 to the layup tool 20 around the band 34, and to the tips 85a of the outer legs 86 of the H-shaped seal area 82. In embodiments utilizing a caul plate (not shown), the inner vacuum bag 60 may be sealed to the caul plate or to a caul plate vacuum bag (not shown).

The outer vacuum bag 94 is sealed by an outer bag seal 98 to the bands 34, outside of the inner bag seal 100, and to the tips 86a of the outer legs 86 of the H-shaped seal area 82. The outer seal legs 85, 86 along with seal legs 87 form an outer bag vacuum chamber 96 which communicates with the area 93 beneath the outer vacuum bag 94. The inner vacuum bag 60 is in communication with an inner vacuum bag chamber 92 formed by the inner seal 50 and the outer legs 85 of the H-shaped seal area 82. The inner seal chamber 64 is defined by the middle seal 48, the inner seal 50 and the inner legs 83 of the H-shaped seal area 82. The outer seal chamber 66 is defined by the outer seal 46, the middle seal 48 and the inner legs 83, 84 of the H-shaped seal area 82. During processing of the composite skin layup 56 in an autoclave, evacuation of the outer vacuum bag 94 draws the outer vacuum bag 94 down against and compresses the inner bag seal 100. The compressive force applied to the inner bag seal 100 by the outer vacuum bag 94 supplements the applied autoclave pressure 62, to reduce the possibility of air leaks through the inner bag seal 100.

The area 80 beneath the inner vacuum bag 60 along with the inner bag vacuum chamber 92 are coupled with vacuum ports 104. One or more vacuum pressure probes 106 are provided to sense a change in vacuum pressure within the inner vacuum bag 60 and the inner bag vacuum chamber 92. Similarly, one or more vacuum ports 74 are coupled with the inner seal chamber 64 to selectively draw a vacuum or vent the inner seal chamber 64. One or more vacuum pressure probes 78 are used to sense a change in vacuum pressure within the inner seal chamber 64. Also, one or more vacuum ports 72 are coupled with the outer seal chamber 66 to selectively draw a vacuum or vent the outer seal chamber 66. One or more pressure probes 76 are used to sense a change in vacuum pressure within the outer seal chamber 66.

Additional vacuum ports 102 are used to selectively draw a vacuum in, or vent the outer bag vacuum chambers 96.

Figure 10:
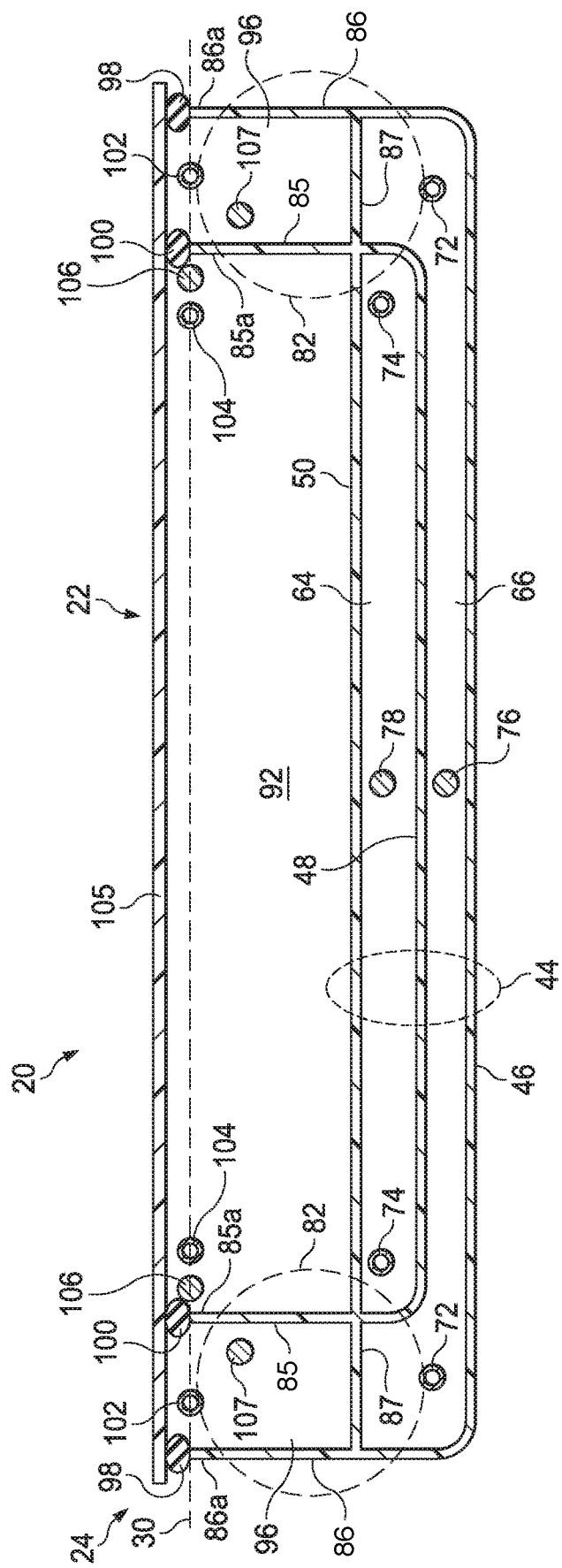
FIG. 10 is an illustration similar to FIG. 9, but showing a temporary plate having been installed for testing the triple seal during assembly of the mandrel segments.

Referring now to FIG. 10, correct assembly of the mandrel segments 22 shown in FIG. 1, and the integrity of triple seal 44 as well as the H-shaped seal area 82 may be tested as the mandrel segments 22 are being assembled, prior to placing a composite layup on the layup tool 20 for processing. By testing the triple seal 44 during the mandrel assembly phase, seal leaks may be detected and corrected before the tool 20 and composite layup is loaded into an autoclave. In order to test the triple seal 44, a temporary test plate 105 is placed over each seam 24 between the mandrel segments 22, and is sealed to the tips 85*a*, 86*a* of the H-shaped seal area 82 by outer seal 98 and inner seal 100. The test plate closes off the inner bag vacuum chamber 92 and the outer bag vacuum chamber 96. Vacuums are drawn in the inner seal chamber 64, the outer seal chamber 66, the inner bag vacuum chamber 92, and the outer bag vacuum chamber 96. A leak in the outer seal 46, the middle seal 48 or inner seal 50 results in a change in vacuum pressure within the inner seal chamber 64, the outer seal chamber 66 and/or the inner bag vacuum chamber 92, and these changes in the vacuum pressure are detected by the respectively associated vacuum probes 78, 76 and 106.

Similarly, the integrity of the H-shaped seal area 82 may be checked for leaks. In the event that the outer legs 86 have a leak, the resulting change in the vacuum pressure in the outer bag vacuum chamber 96 will be detected by the vacuum probes 107. In the event that both of the outer legs 85, 86 have a leak, the vacuum pressure within the inner bag chamber 92 is reduced, and this reduction in vacuum pressure is sensed by vacuum probes 106.

FIG. 11 broadly illustrates the components of a system for testing and monitoring the integrity of seals used to seal a multi-piece, segmented tool such as a segmented layup mandrel 20. A composite layup 56 may be laid up on the segmented mandrel 20, and covered by one or more vacuum bags 60, 94. The vacuum bags 60, 94 are individually sealed to the segmented mandrel 20. The segments 22 of the mandrel 20 are sealed to each other along seams 24 by a triple seal 44. The airtight chambers 64, 66, 92 formed by the triple seal 44 are coupled with vacuum pressure probes 76, 78, 106 and vacuum ports 72, 74, 102, 104, as previously described. A controller 108, which may comprise a programmed general purpose computer or a PLC (programmable logic controller) receives pressure data from the vacuum pressure probes 76, 78, 106 and selectively connects the vacuum ports 72, 74, 102, 104 with a vacuum source 110 or a vent 115.

Referring now again to FIG. 9, after the mandrel segments 22 have been assembled, and a composite skin 56 has been laid up on the layup surface 30 of the mandrel 20, the mandrel 20 is placed in an autoclave (not shown) where autoclave pressure 62 and heat are applied. Vacuum ports 72, 74, 102, 104 are used to draw vacuums in the inner seal chamber 64, the outer seal chamber 66, the inner vacuum bag chamber 92 and the outer bag vacuum chamber 96. The vacuum generated within the inner bag vacuum chamber 92, along with autoclave pressure 62 compact and consolidate the composite layup 56 during a cure cycle. The outer vacuum bag 94 may add additional compaction pressure to the composite skin layup 56, and also applies a compressive force to the inner bag seal 100.

If the triple seal 44 is functioning properly (without air leaks), vacuum pressure probes 76, 78 and 106 register relatively low, preselected levels of vacuum pressure indicating that the integrity of the outer seal 46, the middle seal 48 and the inner seal 50 is intact. In the event of a leak in the outer seal 46, air pressure enters the outer seal chamber 66, causing a change (reduction) in the vacuum pressure within the outer seal chamber 66. This change in vacuum pressure is detected by the vacuum probe 76. In the event of a leak in the outer seal 46, the middle seal 48 and the inner seal 50 maintain the required vacuum pressure in the inner bag vacuum chamber 92.

In the event that both of the outer seal 46 and the middle seal 48 have leaks, air pressure enters the inner seal chamber 64 but the inner seal 50 maintains the required vacuum pressure in the inner bag chamber 92. Under these circumstances, the leak in the middle seal 48 allows air pressure to enter the inner seal chamber 64. A reduction in the vacuum pressure within the inner seal chamber 64 is detected by the vacuum pressure probe 78. In the event of leaks in each of the outer seal 46, middle seal 48 and inner seal 50, air pressure enters the inner vacuum bag chamber 92 and the resulting change in vacuum pressure is detected by the vacuum probes 106.

It may be possible to detect a leak in the middle seal 48 under circumstances where there is no leak in the outer seal 46. This middle seal 48 leak detection may be achieved by maintaining the vacuum pressure in the inner seal chamber 64 at a level that is greater than the vacuum pressure maintained in the outer seal chamber 66. Using this technique, a leak in the middle seal 48 will result in a change in the vacuum pressure which is detected by the vacuum pressure probes 78 in the inner seal chamber 64.

The use of the outer bag 94 in combination with the H-shaped seal area 82 provides further protection against loss of compaction pressure in the event of seal leaks. The H-shaped seal area 82 along with the inner and outer bag seal 98, 100 form double seals with the outer bag 94 that are independent of the outer seal 46, middle seal 48 and inner seal 50. Thus, in the event of a loss of vacuum pressure within the bag vacuum chamber 92, the vacuum pressure is nevertheless maintained within the outer bag vacuum chamber 96 and within the area 93 beneath the outer vacuum bag 94. Consequently, the outer vacuum bag 94 maintains the required compaction pressure against the composite skin layup 56.

FIG. 12 illustrates the overall steps of a method of sealing and testing multiple segments of a mandrel in an autoclave environment. At step 112, an inner bag vacuum chamber 92 is formed that overlaps the seams 24 of the mandrel segments 22 and an inner seal 50 between the mandrel segments 22. At 114, an outer vacuum bag chamber 96 and H-shaped seal area 82 are formed on opposite ends of the inner bag vacuum chamber 92. At 116, an outer seal chamber 66 is formed using the H-shaped seal area 82, an outer seal 46 and a middle seal 48. At 118, an inner seal chamber 64 is formed using the middle seal 48 and the inner seal 50. At 120, a leak in any one of the inner seal 50, the middle seal 48 or outer seal 46 is detected. The leak may be detected by sensing a change in vacuum pressure within the inner and outer vacuum bag chambers 92, 96.

FIG. 13 illustrates the overall steps of an alternate method of sealing and testing the integrity of seals between at least two tool segments 22. At step 122, an inner seal 50, an outer seal 46 and a middle seal 48 are arranged to form first and second seal chambers, 64, 66 respectively. At 124, a vacuum is applied to each of the first and second seal chambers 64, 66. At 126, a leak is detected in any one of the inner seal 50, the outer seal 46 and the middle seal 48 by sensing a change in vacuum pressure within either of the first and second seal chambers 64, 66.

Figure 14:
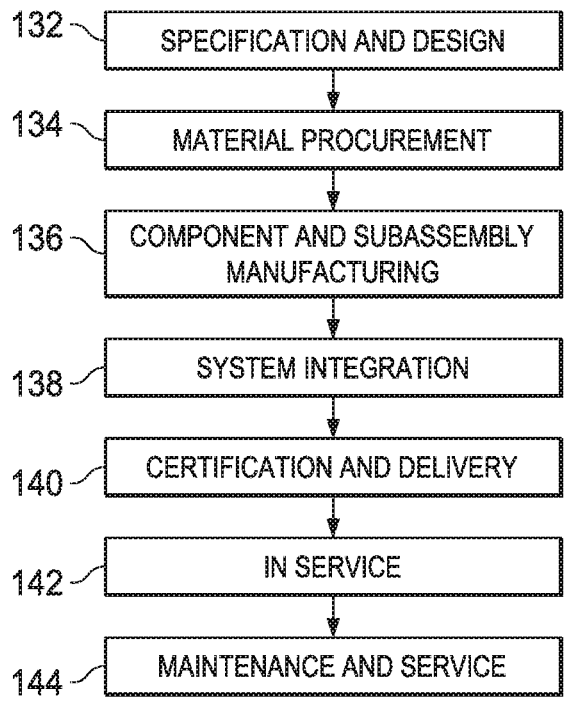
FIG. 14 is an illustration of a flow diagram of aircraft production and service methodology.
Figure 15:
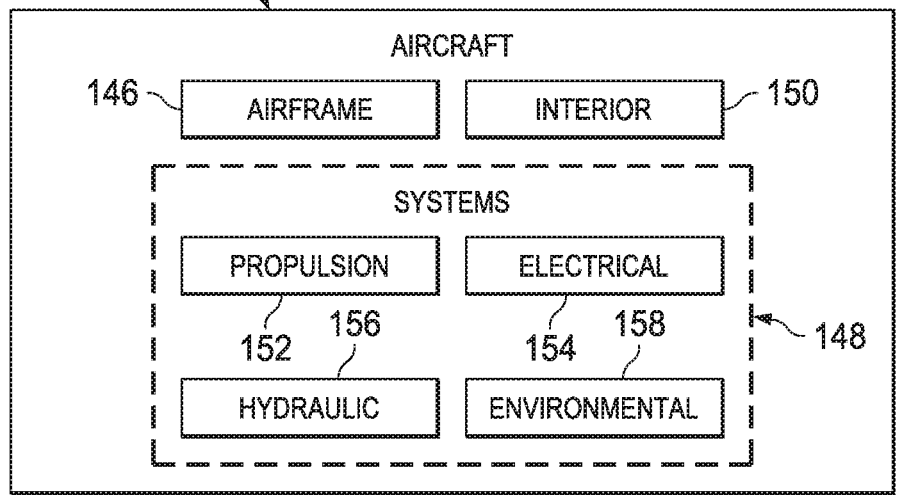
FIG. 15 is an illustration of a block diagram of an aircraft.

Embodiments of the disclosure may find use in a variety of potential applications, particularly in the transportation industry, including for example, aerospace, marine, automotive applications and other application where it is necessary to seal segmented tools, such as those used to autoclave process composite parts. Thus, referring now to FIGS. 14 and 15, embodiments of the disclosure may be used in the context of an aircraft manufacturing and service method 128 as shown in FIG. 14 and an aircraft 130 as shown in FIG. 15. Aircraft applications of the disclosed embodiments may include, for example, without limitation, composite shells forming part of barrel-shaped fuselage sections. During pre-production, exemplary method 128 may include specification and design 132 of the aircraft 130 and material procurement 134. During production, component and subassembly manufacturing 136 and system integration 138 of the aircraft 130 takes place. Thereafter, the aircraft 130 may go through certification and delivery 140 in order to be placed in service 142. While in service by a customer, the aircraft 130 is scheduled for routine maintenance and service 144, which may also include modification, reconfiguration, refurbishment, and so on.

Each of the processes of method 128 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 130 produced by exemplary method 128 may include an airframe 146 with a plurality of systems 148 and an interior 150. Examples of high-level systems 148 include one or more of a propulsion system 152, an electrical system 154, a hydraulic system 156 and an environmental system 158. Any number of other systems may be included. Although an aerospace example is shown, the principles of the disclosure may be applied to other industries, such as the marine and automotive industries.

Systems and methods embodied herein may be employed during any one or more of the stages of the production and service method 128. For example, components or subassemblies corresponding to production process 136 may be fabricated or manufactured in a manner similar to components or subassemblies produced while the aircraft 130 is in service. Also, one or more apparatus embodiments, method embodiments, or a combination thereof may be utilized during the production stages 136 and 138, for example, by substantially expediting assembly of or reducing the cost of an aircraft 130. Similarly, one or more of apparatus embodiments, method embodiments, or a combination thereof may be utilized while the aircraft 130 is in service, for example and without limitation, to maintenance and service 144.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of sealing between two segments of a mandrel, comprising:
arranging an inner seal, an outer seal, and a middle seal to form first and second seal chambers between the two mandrel segments, wherein the inner, outer and middle seals seal the mandrel segments together;
applying a vacuum to each of the first and second seal chambers; and
sensing a change in vacuum pressure within the first and second seal chambers.

2. The method of claim 1, further comprising:
placing an H-shaped seal area between the two mandrel segments, and connecting legs of the H-shaped seal area to each of the middle and the outer seals.

3. The method of claim 2, further comprising:
placing an inner vacuum bag over the two mandrel segments; and
sealing the inner vacuum bag to the H-shaped seal area.

4. The method of claim 3, further comprising:
placing an outer vacuum bag over the two mandrel segments covering the inner vacuum bag; and
sealing the outer vacuum bag to legs of the H-shaped seal area.

5. The method of claim 4, further comprising:
using the outer vacuum bag to apply pressure to a seal between the inner vacuum bag and the H-shaped seal area.

6. The method of claim 1, wherein the inner seal, middle seal, and outer seal are circumferentially spaced apart from each other.

7. A method of sealing between segments of a mandrel, comprising:
arranging an inner seal, an outer seal, and a middle seal to form first and second seal chambers between a first mandrel segment and a second mandrel segment, wherein the inner, outer and middle seals seal the first mandrel segment and the second mandrel segment together, wherein the first seal chamber is formed between the inner seal and the middle seal, and wherein the second seal chamber is formed between the outer seal and the middle seal;
applying a vacuum to each of the first and second seal chambers; and
sensing a change in vacuum pressure within the first seal chamber or the second seal chamber.

8. The method of claim 7, wherein the inner seal, middle seal, and outer seal are circumferentially spaced apart from each other.

9. The method of claim 7 further comprising detecting a leak in the inner seal by sensing the change in vacuum pressure in the first seal chamber.

10. The method of claim 7 further comprising detecting a leak in the outer seal by sensing the change in vacuum pressure in the second seal chamber.

11. The method of claim 7 further comprising:
placing an H-shaped seal area between the first mandrel segment and the second mandrel segment; and
connecting first legs of the H-shaped seal area to each of the middle and the outer seals.

12. The method of claim 11 further comprising:
placing an inner vacuum bag over the first mandrel segment and the second mandrel segment; and
sealing the inner vacuum bag to the H-shaped seal area.

13. The method of claim 12 further comprising:
placing an outer vacuum bag over the first mandrel segment and the second mandrel segment and covering the inner vacuum bag; and
sealing the outer vacuum bag to second legs of the H-shaped seal area.

14. The method of claim 13 further comprising:
using the outer vacuum bag to apply pressure to a seal between the inner vacuum bag and the H-shaped seal area.

15. The method of claim 7 further comprising:
laying up a composite part on the first mandrel segment and the second mandrel segment.

16. The method of claim 7, wherein at least one vacuum probe senses the change in vacuum pressure within the first seal chamber or the second seal chamber.

17. A method of sealing and testing the integrity of seals between two segments of a mandrel, comprising:
arranging an inner seal, an outer seal, and a middle seal to form first and second seal chambers between the two mandrel segments, wherein the inner, outer and middle seals seal the mandrel segments together;
applying a vacuum to each of the first and second seal chambers; and
detecting a leak in the inner seal or the outer seal by sensing a change in vacuum pressure within the first and second seal chambers.

18. The method of claim 17, wherein the inner seal, middle seal, and outer seal are circumferentially spaced apart from each other.

19. The method of claim 17, wherein detecting the leak in the inner seal or the outer seal comprises detecting a leak in the inner seal by sensing the change in vacuum pressure in the first seal chamber.

20. The method of claim 17, wherein detecting the leak in the inner seal or the outer seal comprises detecting a leak in the outer seal by sensing the change in vacuum pressure in the second seal chamber.

* * * * *